(12) United States Patent
Raaf

(10) Patent No.: US 7,813,704 B1
(45) Date of Patent: Oct. 12, 2010

(54) METHOD FOR REGULATING THE TRANSMITTER POWER IN A RADIO SYSTEM AND CORRESPONDING RADIO SYSTEM

(75) Inventor: Bernhard Raaf, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 720 days.

(21) Appl. No.: 10/009,858

(22) PCT Filed: Apr. 3, 2000

(86) PCT No.: PCT/DE00/01021

§ 371 (c)(1),
(2), (4) Date: Dec. 22, 2001

(87) PCT Pub. No.: WO00/65744

PCT Pub. Date: Nov. 2, 2000

(30) Foreign Application Priority Data

Apr. 22, 1999 (DE) .............................. 199 18 372

(51) Int. Cl.
H04B 7/185 (2006.01)
H04B 7/00 (2006.01)
H04B 1/00 (2006.01)

(52) U.S. Cl. .................. 455/69; 455/13.4; 455/522

(58) Field of Classification Search ............... 340/7.32, 340/7.37, 425.2, 855.8; 370/318; 379/395.01; 455/13.4, 522, 127.1, 69
See application file for complete search history.

(56) References Cited

U.S. PATENT DOCUMENTS

| | | | | |
|---|---|---|---|---|
| 4,518,961 A * | 5/1985 | Davis et al. ................. 340/7.35 |
| 5,280,472 A * | 1/1994 | Gilhousen et al. ........... 370/335 |
| 5,603,096 A * | 2/1997 | Gilhousen et al. ............. 455/69 |
| 5,751,731 A * | 5/1998 | Raith .......................... 714/752 |
| 5,812,938 A * | 9/1998 | Gilhousen et al. ............. 455/69 |
| 5,946,329 A | 8/1999 | Hirose et al. |
| 5,982,294 A * | 11/1999 | Takayama et al. .......... 340/7.44 |
| 6,366,625 B1 * | 4/2002 | Minami et al. .............. 375/341 |
| 6,603,773 B2 * | 8/2003 | Laakso et al. ............... 370/441 |
| 6,816,507 B1 * | 11/2004 | Jarbot et al. ................. 370/465 |
| 2001/0018741 A1 * | 8/2001 | Hogan ......................... 713/189 |

FOREIGN PATENT DOCUMENTS

| | | |
|---|---|---|
| EP | 0683570 A2 | 11/1995 |
| EP | 0 893 889 A2 | 1/1999 |
| EP | 893889 A2 * | 1/1999 |

(Continued)

OTHER PUBLICATIONS

Erfindungsmeldung: Kodierung Power control Bits.

(Continued)

*Primary Examiner*—Lester Kincaid
*Assistant Examiner*—Matthew Sams
(74) *Attorney, Agent, or Firm*—King & Spalding L.L.P.

(57) ABSTRACT

In a radio system, in particular a CDMA mobile radio system, a receiver evaluates a signal received from a transmitter and produces power control information for setting the transmission power as a function of this evaluation. In order to improve the transmission reliability of the power control information, it is coded, and is transmitted to the transmitter, together with further data from the said timeslot, for example with bits from the format identification information.

21 Claims, 2 Drawing Sheets

FOREIGN PATENT DOCUMENTS

| | | |
|---|---|---|
| JP | 8037515 A | 2/1996 |
| JP | 9205373 A | 8/1997 |
| WO | WO 99/67899 | 12/1999 |

OTHER PUBLICATIONS

SMG2 UMTS Physical Layer Expert Group UTRA Physical Layer Description FDD parts (v0.4, Jun. 25, 1998).

ETSI SMG2 L1 Expert Group—Soft TPC Interpretation for Improved Closed Loop Power Control (revision).

Japan's Proposal for Candidate Radio Transmission Technology on IMT-2000.W.CDMA, Japan, ARIB IMT-2000 Study Commitee, Jun. 1998, pp. 19-21.

\* cited by examiner

METHOD FOR REGULATING THE TRANSMITTER POWER IN A RADIO SYSTEM AND CORRESPONDING RADIO SYSTEM

BACKGROUND OF THE INVENTION

The present invention relates to a method for controlling the transmission power in a radio system, and to a corresponding radio system, in particular a corresponding mobile radio system.

Transmission power control in mobile radio systems is an important performance feature in order to be able to suppress possible interference between the individual connections and, hence, to allow the capacity and quality of the connections to be improved, as well as to be able to reduce the mean transmission power, to achieve the best possible matching to the requirements and to allow losses via the transmission channels to be at least partially compensated for.

To this end, the signal transmitted by a transmitter is evaluated at the receiving end in the mobile radio system in order to allow information to be produced as a function of this for power control, and to allow this information to be transmitted to the transmitter, which then adjusts the transmission power in accordance with the power control information.

In order to explain the principle of power control in more detail, FIG. 2 shows the communication between a base station 1 and a mobile station 2 in a mobile radio system. A connection from the base station 1 to the mobile part 2 is referred to as the downlink or forward link connection, while a connection from the mobile part 2 to the base station 1 is referred to as the uplink connection, or reverse link connection. For power control in the downlink, the respective received signal is evaluated in the mobile station 2, and power control information is produced as a function of this and is sent back to the base station 1, so that the base station 1 can adjust the transmission power appropriately. In order to control the uplink, the received signal is evaluated in the base station 1, where the power control information is produced and the mobile station 2 is instructed to carry out power matching.

The power control information is, in this case, transmitted within a predetermined frame structure, depending on the respective mobile radio system.

FIG. 3 shows an example of the frame and timeslot structure for a downlink connection in a mobile radio system operated using a code division multiple access method (CDMA). The frame and timeslot structure shown in FIG. 3 corresponds, in particular, to a UMTS mobile radio channel (Universal Mobile Telecommunications System), which is also referred to as DPCH (Dedicated Physical Channel) in accordance with the current state of UMTS standardization. UMTS is the designation for third-generation mobile radio systems, with the aim of a worldwide, universal mobile radio standard. According to the UMTS mobile radio standard, the WCDMA method (Wideband Code Division Multiple Access) is intended for use as the multiple access method.

The frame structure shown in FIG. 3 and with a duration of 720 ms includes, in particular, 72 frames 3 of identical construction and having a frame duration of 10 ms, with each frame, in turn, having 16 timeslots 4, with a timeslot duration of 0.625 ms. Each timeslot 4 includes information split between a logical control channel (DPCCH, Dedicated Physical Control Channel) and a logical data channel (DPDCH, Dedicated Physical Data Channel). The DPCCH section includes a pilot bit sequence 5 and TPC information (Transmitter Power Control) 6 and TFI information (Transmitter Format Identifier) 7. The DPDCH section includes user data bits 8. The structure shown in FIG. 3 can be found, for example, in the document ETSI STC SMG2 UMTS-L1: Tdoc SMG2 UMTS-L1 221/98.

The pilot bit sequence 5 is used for estimating the channel impulse response during a training sequence, and corresponds to a known bit pattern. The receiver can determine or estimate the channel impulse response of the mobile radio channel by comparing the received signal with the known pilot bit sequence.

The TFI information 7 is used for format identification for the respective receiver. The TFI bits are protected, according to the present WCDMA Standard, via a specific coding method, and are distributed over an entire frame (time duration 10 ms) by interleaving. If the TFI information 7 in each timeslot includes, for example, three bits b4 . . . b5 as shown in FIG. 3, there are a total of 3*16=48 TFI bits per frame, which includes 16 timeslots, and these bits are coded via a bi-orthogonal coding method.

The TPC information 6 represents the command, produced by the receiver and transmitted to the transmitter, to adjust the transmission power. To do this, the received power in the receiver or the signal-to-noise ratio in the received signal is compared with a predetermined reference value, and the value for the power adjustment command is determined as a function of the discrepancy. As such, if the received power exceeds the reference value, a command is produced to reduce the transmission power, while a command to increase the transmission power is produced if the received power is less than the predetermined reference value. Thus, depending on the comparison result, the receiver transmits a digital or binary adjustment command to the transmitter. In this case, a command to increase the transmission power (power up command) is coded with a 1, while a command to reduce the transmission power (power down command) is coded with a 0. In each case, the adjustment command is transmitted to the transmitter after appropriate modulation. According to the WCDMA Standard for UMTS mobile radio systems that is currently under discussion, the transmission is carried out via QPSK modulation (Quadrature Phase Shift Keying), by which the binary 1 or 0 are changed to respective values −1 and +1, followed by the power control signal being spread.

The power control information, thus, generally includes only one bit, which indicates whether the transmission power should be increased or reduced at the transmission end. In order to allow this bit to be transmitted with a sufficiently low error probability, the bit is transmitted repeatedly. The TPC information shown in FIG. 3 in consequence, for example, includes three bits b1 . . . b3, which are transmitted successively with identical information contents. However, the power control information also may include a different number of bits; for example, more bits.

Relatively powerful coding methods which are known per se and via which it would be possible to achieve a better error probability are not used since the TPC bits will need to be evaluated immediately in the receiver of the TPC information in order to allow the transmission power to be readjusted appropriately without delay. According to the prior art, the TPC bits are not coded together with other bits or data and also can not be distributed over a relatively long time period, for example over an entire frame, which is referred to as interleaving.

However, there is a requirement for the TPC bits to be transmitted correctly with as high a reliability level as possible in order to avoid the transmitter incorrectly or not reliably receiving the corresponding power adjustment command.

The document ETSI SMG2 L1 Expert Group, Tdos SMG2 UMTS-L1 736/98, Espoo, Finland, Dec. 14-18, 1998, "Soft TPC Interpretation for Improved Closed Loop Power Control" discusses the reliability of the power adjustment command transmitted to the transmitter, and adjustment in as optimum a manner as possible of the value of the power adjustment command as a function of the reliability of its reception. In this case, the authors indicate that the value of the power adjustment command should be chosen depending on the function tanh ($\Lambda/2$), where $\Lambda$ represents the reliability of the power adjustment command in the form of a log-likelihood distribution.

The present invention is directed toward providing an improved method for controlling the transmission power in a radio system, in particular in a mobile radio system, as well as a corresponding radio system, by which the reliability of transmission of the power control information can be improved.

SUMMARY OF THE INVENTION

According to the present invention, the power control information transmitted in one timeslot is coded together with further data which is intended to be transmitted in the same timeslot. Both the power control information and this further data or information are preferably transmitted in binary form, so that the power control information (TPC bits) transmitted in one timeslot is not simply transmitted repeatedly, but is coded together with further bits, which are intended to be transmitted within the same timeslot. These further bits may be, for example, the bits in the TFI information (TFI bits) in a WCDMA mobile radio system. However, in principle, other bits, for example data bits, also can be used for coding with the TPC bits, provided they are intended to be, or can be, transmitted in the same timeslot at the TPC bits.

The coding method used for coding the TPC bits can in principle, be chosen as required. However, the coding method is advantageously chosen such that the coding process provides added redundancy, which can be utilized during reception of the coded power control information to check the transmitted value of the power control information.

The coding method may, for example, include the TPC bits being coded together with the further bits to be coded with them to form a common binary data word, at least some of whose bit values depend not only on the value of the TPC bits but also on the value of the further bits, for example the TFI bits. The bits to be coded with one another can thus, in particular, be linked via a logic exclusive-OR operation.

An advantage of the present invention is that the added redundancy, which results from the dependency of the coded bits on both the value of the TPC bits and the value of the further bits to be coded with them, allows additional estimated values to be obtained for the power control information to be transmitted, which then can be used to check the received power control information, in order to increase the reliability of transmission of the power control information.

The present invention is preferably used in CDMA mobile radio systems, especially in WCDMA mobile radio systems, such as the UMTS mobile radio system. Furthermore, the present invention is preferably used in a mobile radio system in the downlink, that is to say for transmission of the power control information from the base station to the mobile station, since CDMA mobile radio systems have increased delay times in the uplink, owing to the code division multiplexing method used. In principle, the present invention can, however, be applied to any type of radio system in which it is intended to transmit power control information embedded in a (frame and) timeslot structure.

Additional features and advantages of the present invention are described in, and will be apparent from, the following Detailed Description of the Invention and the Figures.

DETAILED DESCRIPTION OF THE INVENTION

Figure 1:
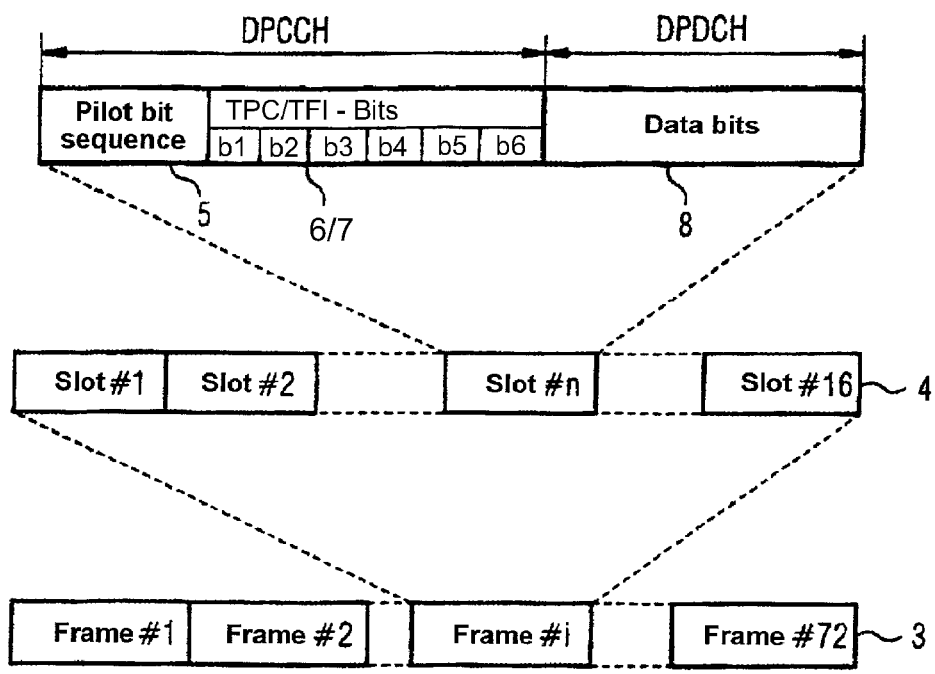
FIG. 1 shows the frame and timeslot structure according to the present invention for a downlink connection in a WCDMA mobile radio system to which the present invention is preferably applied.
Figure 2:
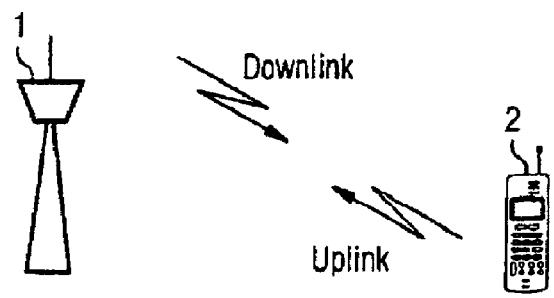
FIG. 2 shows a schematic illustration of a mobile radio system in order to explain the information transmission for power control.
Figure 3:
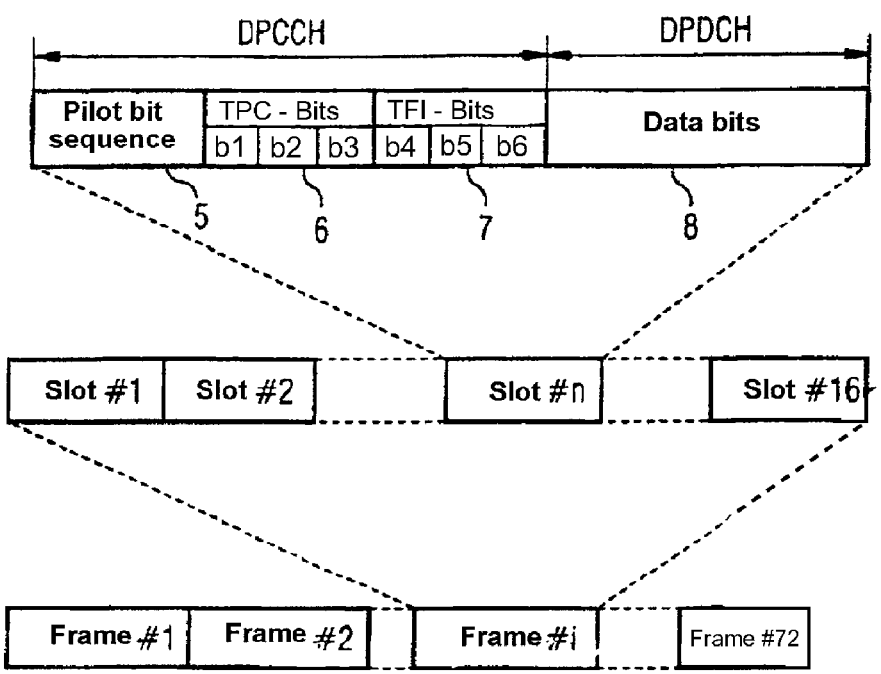
FIG. 3 shows the known frame and timeslot structure for a downlink connection in a WCDMA mobile radio system.

The frame and timeslot structure shown in FIG. 1 indicates the principle on which the present invention is based, with the fundamental layout of this structure corresponding to the structure shown in FIG. 3, so that reference also should be made to the corresponding explanatory notes relating to FIG. 3.

As has already been described initially, in the structure shown in FIG. 3, the bits for power control information 6 (referred to as TPC bits in the following text) are transmitted separately from the further information, to be transmitted in the same timeslot, in a timeslot 4. In particular, the power control information normally includes only one bit value, which is transmitted a number of times successively, according to FIG. 3, for example, three times in the form of the TPC bits b1 . . . b3. The further control and data bits are separated from the TPC bits b1 . . . b3.

However, according to the present invention, this separation is canceled, and the TPC bits b1 . . . b3 are coded together with further bits which are transmitted in the same timeslot 4. These may be, for example, the bits in the format identification information 7 (referred to as TFI bits in the following text). However, other bits, such as bits in the data information 8, also can be used for coding the TPC bits.

In order to explain the principle on which the present invention is based, it is assumed by way of example in the following text that the power control information includes three TPC bits b1 . . . b3, which are intended to be coded, in redundant form, together with three TFI bits b4 . . . b6 of format identification information. The value of the power control information to be transmitted is denoted p, while the value of the format identification information to be transmitted in the same timeslot 4 is denoted t.

With the conventional structure shown in FIG. 3, the bits b1 . . . b3 would all be assigned the value p, while the bits b4 . . . b6 would define the value t, separately from this.

According to one preferred exemplary embodiment of the present invention, it is now proposed that a coded data word which is common to the power control information and format identification information be generated from the bits b1 . . . b6, at least some of whose bit values are influenced not only by the value p but also by the value t. In particular, the bits b1 . . . b6 in this coded data word can be allocated as follows, in the course of coding:

$$b1 = b2 = p$$
$$b3 = b4 = p \text{XOR} t$$
$$b5 = b6 = t$$

The coded data word thus includes a total number of bits corresponding to the sum of the TPC bits and TFI bits, in which, however, some of the bits in this data word are occupied only with the TPC value p (see the bits b1 and b2), while a further portion of this data word is occupied only by the TFI value t (see the bits b5 and b6). A third section of the data word is, finally, obtained via a logic operation, in particular via a logic exclusive-OR operation, between the TPC value p and the TFI value t (see the bits b3 and b4). Thus, in comparison to the conventional structure shown in FIG. 3, the bits b3 ... b6 are used differently in the coding method described above.

After the transmission of this code word with the coded bits b1 ... b6 to the transmitter for appropriate readjustment of the transmission power, the transmitter can use the information contained in the bits b3 ... b6 to calculate an estimated value p' for the TPC information. To do this, the transmitter uses b5 and b6 to determine an estimated value for t, so that the estimated value p' can be calculated from the bits b3 and b4, on the basis of the estimated value of t, and utilizing the known XOR function.

This estimated value p' thus replaces the estimated value for the power control information obtained from the bit b3 when using the known structure shown in FIG. 3. This procedure has the advantage that p' is, in each case, based on two bits, with this combination making it possible to achieve a transmission capability that is improved by 3 dB.

The calculation of the XOR function admittedly results in a higher bit error rate. However, at least when the channel or transmission conditions are not very bad, this is more than compensated for by the gain. This will be explained briefly below.

If f denotes the probability that a bit will be detected incorrectly, then the probability of incorrect detection is improved approximately to $f^2$ if this bit is transmitted twice. On the other hand, the probability of incorrect detection resulting from the XOR calculation deteriorates approximately to 2f since, in this case, the XOR calculation produces an incorrect value just by one of the two XOR-linked values or bits having been detected incorrectly. The coding method described above thus gives better results provided the following relationship is satisfied:

$2f^2 < f$

Or $f < 0.5$

This relationship is satisfied for WCDM transmission methods, so that the present invention ensures improved transmission reliability, particularly when used in (W)CDMA mobile radio systems.

Although the present invention has been described with reference to specific embodiments, those of skill in the art will recognize that changes may be made thereto without departing from the spirit and scope of the invention as set forth in the hereafter appended claims.

The invention claimed is:

1. A method for controlling the transmission power in a radio system, the method comprising the steps of:

evaluating a signal received by a receiver via a transmission channel of the radio system from a transmitter;
producing power control information as a function of the signal;
embedding the power control information in a timeslot structure together with further data to be transmitted in the same timeslot to said transmitter
coding, in the receiver, the power control information in one time slot in a manner where the power control information is coded, with the addition of redundancy, together with the further data to be transmitted in the same time slot to form a common data word, with at least one bit value in the data word depending on the power control information and on the further data; and
transmitting the coded power control information in one timeslot to the transmitter, together with the further data to be transmitted in the same time slot; and
setting, in the transmitter, the transmission power as a function of the transmitted coded power control information.

2. A method for controlling the transmission power in a radio system as claimed in claim 1, wherein the further data is data for format identification information.

3. A method for controlling the transmission power in a radio system as claimed in claim 1, wherein the further data is user data.

4. A method for controlling the transmission power in a radio system as claimed in claim 1, wherein the power control information is transmitted in binary form.

5. A method for controlling the transmission power in a radio system as claimed in claim 4, wherein bits in the power control information are coded with bits of the further data to form a common binary data word.

6. A method for controlling the transmission power in a radio system as claimed in claim 5, wherein the coded data word comprises a plurality of bits corresponding to a sum of the bits in the power control information and the bits in the further data.

7. A method for controlling the transmission power in a radio system as claimed in claim 5, wherein, during the coding process, at least one bit in the coded data word is assigned a value of the power control information to be transmitted in the corresponding time slot.

8. A method for controlling the transmission power in a radio system as claimed in claim 5, wherein, during the coding process, at least one bit in the coded data word is assigned a value of the power control information to be transmitted in the corresponding time slot from the further data.

9. A method for controlling the transmission power in a radio system as claimed in claim 1, wherein during the coding process, at least one bit in the coded data word is assigned a value which corresponds to a logic operation between the power control information to be transmitted in the corresponding time slot and the information to be transmitted in the same time slot from the further data, and a logic exclusive-OR operation is used as the logic operation.

10. A method for controlling the transmission power in a radio system as claimed in claim 1, the method further comprising the step of:

recovering the power control information in the transmitter via appropriate decoding, with an estimated value being determined for the power control information during the decoding process based on the value obtained by the logic operation from the corresponding bit in the coded data word.

11. A method for controlling the transmission power in a radio system as claimed in claim 1, wherein the receiver which produces the coded power control information is a base station in a mobile radio system, and the transmitter which received the power control information and sets its transmission level appropriately is a mobile station in the mobile radio system, such that the coded power control information is transmitted via a downlink connection between the receiver and the transmitter.

12. A radio system, comprising:
a transmitter; and
a receiver for receiving a signal from the transmitter, which is transmitted via a transmission channel of the mobile radio system, wherein the receiver:
evaluates the signal;
produces power control information as a function of the signal;
embeds the power control information in a timeslot structure together with further data to be transmitted in the same timeslot to said transmitter;
codes the power control information in a one time slot in a manner where the power control information is coded, with the addition of redundancy, together with the further data to be transmitted in the same time slot to form a common data word, with at least one bit value in the data word depending on the power control information and on the further data; and
transmits the coded power control information in one timeslot to the transmitter, together with the further data to be transmitted in the same time slot,
and wherein the transmitter sets the transmission power as a function of the transmitted coded power control information.

13. A radio system as claimed in claim 12, wherein the receiver codes the power control information together with data from format identification information for the same time slot.

14. A radio system as claimed in claim 12, wherein the receiver send the power control information to the transmitter in a binary form.

15. A radio system as claimed in claim 14, wherein the receiver codes bits in the power control information together with bits in the further data to form a common binary data word.

16. A radio system as claimed in claim 15, wherein the receiver, during the coding process, assigns at least one bit in the coded common data word a value of the power control information to be transmitted in the corresponding time slot.

17. A radio system as claimed in claim 15, wherein the receiver, during the coding process, assigns at least one bit in the coded common data word a value of the power control information to be transmitted in the corresponding time slot from the further data.

18. A radio system as claimed in claim 12, wherein the logic operation carried out by the receiver during the coding process is a logic exclusive-OR operation.

19. A radio system as claimed in claim 12, wherein the transmitter, after receiving the coded common data word, recovers the power control information via appropriate decoding and determines an estimated value for the power control information based on the value obtained by the logic operation form the corresponding bit in the coded common data word.

20. A radio system as claimed in claim 12, wherein the radio system is a CDMA mobile radio system.

21. A radio system as claimed in claim 20, wherein the receiver which produces the coded binary power control information is a base station in the mobile radio system, and the transmitter which receives the power control information and sets its transmission power appropriately is a mobile station in the mobile radio system.

* * * * *